United States Patent
Kechichian et al.

(10) Patent No.: US 9,826,085 B2
(45) Date of Patent: Nov. 21, 2017

(54) AUDIO SIGNAL PROCESSING IN A COMMUNICATION SYSTEM

(71) Applicant: KONINKLIJKE PHILIPS N.V., Eindhoven (NL)

(72) Inventors: Patrick Kechichian, Eindhoven (NL); Cornelis Pieter Janse, Eindhoven (NL)

(73) Assignee: KONINKLIJKE PHILIPS N.V., Eindhoven (NL)

(*) Notice: Subject to any disclaimer, the term of this patent is extended or adjusted under 35 U.S.C. 154(b) by 50 days.

(21) Appl. No.: 14/378,204

(22) PCT Filed: Jan. 15, 2013

(86) PCT No.: PCT/IB2013/050365
§ 371 (c)(1),
(2) Date: Aug. 12, 2014

(87) PCT Pub. No.: WO2013/121306
PCT Pub. Date: Aug. 22, 2013

(65) Prior Publication Data
US 2015/0086005 A1    Mar. 26, 2015

Related U.S. Application Data

(60) Provisional application No. 61/598,407, filed on Feb. 14, 2012.

(51) Int. Cl.
*H04M 3/18* (2006.01)
*H04M 9/08* (2006.01)

(52) U.S. Cl.
CPC ............. *H04M 3/18* (2013.01); *H04M 9/082* (2013.01)

(58) Field of Classification Search
None
See application file for complete search history.

(56) References Cited

U.S. PATENT DOCUMENTS 6,724,736 B1 * 4/2004 Azriel ..................... 370/286
7,088,813 B1   8/2006 Brand et al.
(Continued)

FOREIGN PATENT DOCUMENTS

EP    1367738       12/2003
JP    2001094604 A   4/2001
(Continued)

OTHER PUBLICATIONS

M. Tzur and A. A. Goldin, Sound equalization in noisy environment, Audio Engineering Society 110th Convention, Preprint No. 5364, May 2001, pp. 1-4.
(Continued)

Primary Examiner — Fan Tsang
Assistant Examiner — Jeffrey Lytle (57) ABSTRACT

Communications equipment for use by a call center to enable communications between the call center and one or more user devices is provided, with the communications equipment comprising audio processing circuitry for processing audio signals received from the user devices over a communications network, wherein the processing circuitry is configured to perform acoustic echo cancellation and/or noise suppression and/or dereverberation processing on the received audio signals to cancel acoustic echoes and/or suppress noise and/or suppress reverberation that is present in the audio signals received from the user device.

17 Claims, 3 Drawing Sheets

(56) References Cited

U.S. PATENT DOCUMENTS

| | | | |
|---|---|---|---|
| 2001/0006511 A1 | 7/2001 | Matt | |
| 2003/0190040 A1* | 10/2003 | Tegethoff | H04B 3/23 379/406.01 |
| 2004/0028217 A1* | 2/2004 | Ebenezer | H04M 9/08 379/406.01 |
| 2006/0088154 A1* | 4/2006 | Mukhtar et al. | 379/390.01 |
| 2006/0122840 A1* | 6/2006 | Anderson et al. | 704/275 |
| 2006/0153359 A1* | 7/2006 | Stenger | H04M 9/082 379/406.01 |
| 2009/0068978 A1* | 3/2009 | Gottlieb | 455/404.1 |
| 2009/0117949 A1* | 5/2009 | Allen et al. | 455/572 |
| 2009/0168976 A1 | 7/2009 | Nakawaza et al. | |
| 2009/0221261 A1* | 9/2009 | Soliman | 455/343.2 |
| 2009/0296610 A1* | 12/2009 | Bugenhagen | 370/286 |
| 2011/0224501 A1 | 9/2011 | Hudsmith | |
| 2011/0231862 A1* | 9/2011 | Walsh | 719/318 |
| 2012/0250882 A1* | 10/2012 | Mohammad et al. | 381/94.1 |

FOREIGN PATENT DOCUMENTS

| | | |
|---|---|---|
| JP | 2001268611 A | 9/2001 |
| WO | WO9843368 | 10/1998 |

OTHER PUBLICATIONS

International Telecommunications Union, Telecommunication Standardization Sector, Geneva, Switzerland, Lossless compression of G.711 pulse code modulation, Sep. 2009, pp. 1-63.

International Telecommunications Union, Telecommunication Standardization Sector, Geneva, Switzerland, General aspects of digital transmission systems, Coding of speech at 8 kbit/s using conjugate-structure algebraic-code-excited linear-prediction (CS-ACELP), ITU-T Recommendation P.729, Mar. 1996, pp. 1-35.

European Telecommunications Standards Institute, Sophia-Antipolis, France, Digital cellular telecommunications system (Phase 2+); Universal Mobile Telecommunications System (UMTS); LTE; Mandatory speech codec speech processing functions; Adaptive Multi-Rate (AMR) speech codec; Voice Activity Detector (VAD), Apr. 2011.

X. Lu, Acoustic echo cancellation over nonlinear channels, Ph.D. thesis, McGill University, Jan. 2004, pp. 1-60.

A. Gilloire, P. Scalart, C. Lamblin, C. Mokbel, and S. Proust, Innovative speech processing for mobile terminals: an annotated bibliography, Signal Processing, vol. 80, pp. 1149-1166, 2000.

G. Enzner and H. Krüger and P. Vary, On the problem of acoustic echo control in cellular networks, in Proc. Intl. Workshop on Acoustic Echo and Noise Control (IWAENC), Eindhoven (The Netherlands), Sep. 2005, pp. 213-216.

H. Gnaba, P. Scalart, M. T.-H. Alouane, and M. Jaidane-Saidane, Combined acoustic echo canceller for the GSM network, in Proc. EUSIPCO, Toulouse (France), Sep. 2002, pp. 547-550.

H. Gnaba-Daassi, P. Scalart, and C. Marro, A centralized acoustic echo canceller based on perceptual properties, in Proc. EUSIPCO, Antalya (Turkey), Sep. 2005, pp. 1-4.

M. Rages and K.C. Ho, Limits on echo return loss enhancement on a voice coded speech signal, in Circuits and Systems, 2002. MWSCAS-2002. The 2002 45th Midwest Symposium on, Aug. 2002, vol. 2, pp. II-152-II-155.

S. Haykin and B. Widrow, Least-Mean-Square Adaptive Filters, John Wiley and Sons Inc., 2003, pp. 320-341.

N. J. Bershad and A. Bist, Fast coupled adaptation for sparse impulse responses using a partial Haar transform, IEEE Trans. Signal Processing, vol. 53, No. 3, pp. 966-976, Mar. 2005.

P. Kechichian and B. Champagne, An improved partial Haar dual adaptive filter for rapid identification of a sparse echo channel, Signal Process. (2008).

J.D. Gibson, Speech coding methods, standards, and applications, Circuits and Systems Magazine, IEEE, vol. 5, No. 4, pp. 30-49, quarter 2005.

J.W. Shin, Y.G. Jin, S.S. Park and N.S. Kim, Speech Reinforcement based on partial masking effect, Proc. ICASSP 2009 (Tapei, Taiwan), pp. 4401-4404.

R. J. Niederjohn and J. H. Grotelueschen, The enhancement of speech intelligibility in high noise levels by high-pass filtering followed by rapid amplitude compression, IEEE Trans. Acoustics, Speech, and Signal Processing, vol. 24, pp. 277-282, Aug. 1976.

\* cited by examiner

AUDIO SIGNAL PROCESSING IN A COMMUNICATION SYSTEM

CROSS-REFERENCE TO PRIOR APPLICATIONS

This application is the U.S. National Phase application under 35 U.S.C. §371 of International Application Serial No. PCT/IB2013/050365, filed on Jan. 15, 2013, which claims the benefit of U.S. Application Ser. No. 61/598,407, filed on Feb. 14, 2012. These applications are hereby incorporated by reference herein.

TECHNICAL FIELD OF THE INVENTION

The invention relates to a system for enabling a user to contact a call centre using a mobile device, and in particular relates to a method and apparatus for processing audio signals that are being sent to the call centre from a user device.

BACKGROUND TO THE INVENTION

Existing communication networks provide an interconnection of various technologies ranging from landline and cellular devices to IP-based phones or voice services running on computers. From a quality standpoint, maintaining the speech and audio communication performance solely within the network is a very complex and difficult task requiring a huge amount of resources. A general solution is just not feasible due to the sheer number of communication devices with different acoustical characteristics, and which are used in different circumstances. At best, networks attempt to reduce the effects of noise and echo produced by the equipment where various communication technologies interface in the network. For example, line echo cancellers placed before the 4-to-2 converters, known as hybrids, in land-line networks remove the echo caused by the impedance mismatch at these devices.

Therefore, most, if not all communication devices contain a considerable amount of hardware and signal processing to remove unwanted noise and acoustic echoes. Unwanted noise usually originates from the environment in which the device is being used such as a busy street or under windy conditions and is captured by the device's microphone. Acoustic echoes are produced by the coupling between the device's loudspeaker which plays the far-end signal and the microphone. Depending on the design and parts used in the communication device, this coupling can range from mild and linear to strong and highly nonlinear requiring different forms of processing, which is left up to the device manufacturer in order to deliver a standard of performance acceptable to the user of the device. An acoustic echo canceller which is usually implemented using a low-cost linear adaptive filter attempts to model the coupling between device loudspeaker and microphone and remove the echo. Acoustic echo cancellers usually perform satisfactorily under linear echo conditions while degrading in performance in the presence of nonlinearities.

Figure 1:
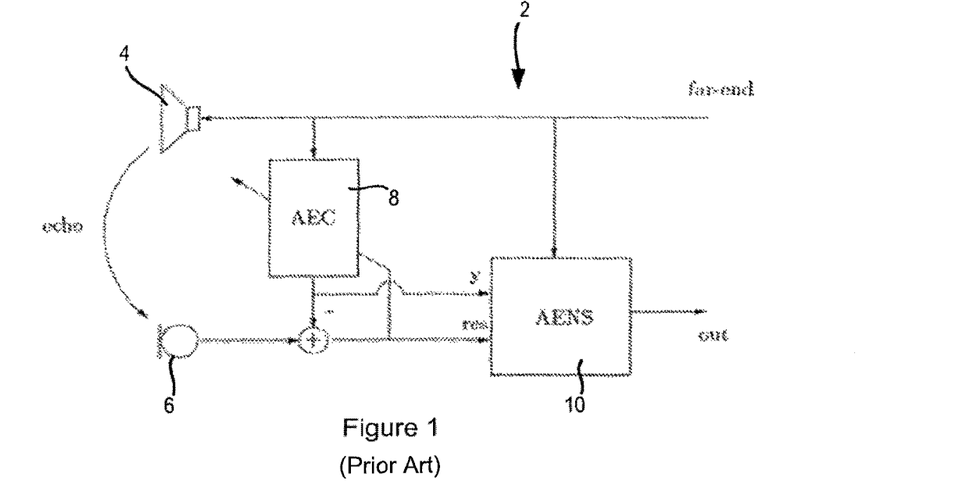
FIG. 1 is a block diagram of a conventional speech enhancement system.

Cellular modules (e.g. GSM, CDMA) which are built into user devices contain both echo and noise suppression functionality, where the echo suppression consists of an echo canceller and a post-processor characterized by a frequency-dependent gain function. It is also common for noise suppression functionality to be handled by this post processor in combination with the echo suppression. A block diagram of an exemplary speech enhancement system 2 that encompasses many of the systems available today is shown in FIG. 1. The system 2 outputs processed audio signals from a far-end user via a speaker 4 and receives audio signals from the near-end user via a microphone 6. As is known, the audio signals output by the speaker 4 will be picked up by the microphone 6 and will produce an echo for the far-end user.

Before digital to analog conversion and amplification for reproduction by the speaker 4, the digital far-end signal serves as an input to an acoustic echo canceller, AEC 8, which uses an adaptive filtering algorithm. The most commonly used algorithm in mobile devices is the Normalized Least Mean Squares (NLMS) algorithm due to its simplicity and low cost. The goal of this algorithm is to estimate the acoustic echo path between the loudspeaker 4 and microphone 6 and to create a replica of the echo signal on the microphone 6 in order to remove it from the microphone signal, resulting in an echo-free residual signal that ideally only contains the near-end user's speech.

Due to a number of factors including under-modeling and the presence of nonlinearities in the acoustic echo path (which can be produced by any or all of the amplifier (not shown in FIG. 1), the speaker 4, and mechanical housing of the device 2), a portion of the echo will inevitably remain in the residual signal that a tuneable post-processor 10 has to remove. The post-processing block 10 usually operates in the frequency domain and offers a trade-off between the amount of echo/noise suppression and the amount of speech distortion. Depending on the acoustics of the device, and consequent severity of residual echo contribution, the resulting two-way audio communication can be characterized as full-duplex or half-duplex. In half-duplex communication, the send (microphone) path is muted by the post-processor 10 when the far-end (loudspeaker) signal is active, while in full duplex communication, both near-end and far-end speakers can interrupt each other. Sometimes, to achieve full-duplex communication, some residual echo remains on the send path, i.e. the post-processor 10 does not distort the near end speech at the cost of not fully suppressing the residual echo component. In half-duplex mode, the post-processor 10 acts as a basic muting switch.

Single-microphone noise suppression algorithms commonly make use of statistics-based noise estimation methods to derive a corresponding gain function. However, for non-stationary noise signals which vary with time, properly tracking and estimating the noise statistics becomes difficult using such an approach. Therefore, many systems also apply over-subtraction, which consequently leads to undesirable distortion of the resulting speech signal.

In addition to signal enhancement systems that aim to suppress unwanted echoes and noise from the microphone signal, algorithms also exist which adjust or equalize the loudspeaker signal depending on the noise in the environment. Also known as speech reinforcement algorithms, these increase the loudness of the loudspeaker signal so that it is not masked out by the surrounding environmental noise. Speech reinforcement systems also exist that are tailored to the needs of the elderly. For example, in US 2006/0088154, a system is presented that analyzes a user's speech to determine if he or she is an elderly person and adjusts the loudspeaker signal accordingly. Most of these algorithms analyze the surrounding noise present on the microphone 6 and apply frequency-dependent gain values to the loudspeaker signal before reproduction.

Figure 2:
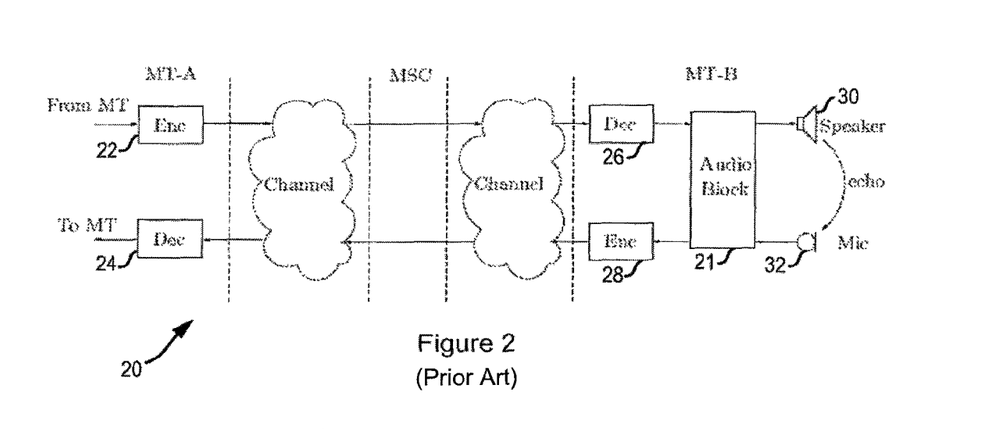
FIG. 2 is a block diagram of a conventional cellular system.

FIG. 2 is a block diagram of a cellular system 20 that consists of two mobile terminals (MT-A and MT-B) representing the users' mobile devices and a mobile switching centre (MSC) or base station that establishes and manages the connection between the two devices.

It has been proposed in WO 98/43368 to move acoustic echo cancellers (AEC) from the mobile devices to the MSCs in order to remove the power burden on the MTs. In FIG. 2 this is represented by the audio block 21. Placing the echo cancellation functionality at the MSC, however, comes at a cost of poorer echo cancellation performance with standard echo cancellation/suppression algorithms due to the presence of speech encoders/decoders (22, 24, 26, 28) which introduce nonlinearities into the echo path. Therefore, more complex algorithms would be required. Furthermore, the acoustical characteristics of devices connected via the MSC are not known in advance. The advantage of having AECs in the MT is that the coupling between loudspeaker 30 and microphone 32 can usually be modeled using a linear finite impulse response filter (FIR) and the processing in the MT is tuned to its specific acoustics. With the presence of nonlinear processing introduced by the encoders, the problem of acoustic echo cancellation becomes more challenging.

FIG. 2 does not illustrate the functionality provided by the MSC. Depending on the types of coders available in the MTs, the MSC has the task of translating the encoding scheme between MTs. It performs this tandeming or transcoding by decoding the MT signal and then re-encoding the signal for proper reception by the second MT. For example, if mobile terminal MT-A uses encoder 22 Enc-A and mobile terminal MT-B uses encoder 28 Enc-B, then the MSC first decodes the incoming signal from MT-A using decoder Dec-A and then re-encodes this signal using encoder Enc-B for transmission to MT-B.

Many elderly people now carry personal help buttons (PHBs) or personal emergency response systems (PERS) that they can activate if they need urgent assistance, such as when they fall. Automated fall detectors are also available that monitor the movements of the user and automatically trigger an alarm if a fall is detected.

These devices (i.e. PHBs, PERS and fall detectors) can initiate a landline call via a base unit located nearby to the user (i.e. typically in the user's home) to a dedicated call centre when they are activated, and the personnel in the call centre can talk to the user and arrange for assistance to be sent to the user in an emergency. As the user is a registered subscriber to the PHB/PERS service, their home location (or other location where the base station is found) will be known, and the emergency assistance can be directed to that location by the call centre personnel.

However, systems are now available that make use of a mobile telephone or other mobile telecommunications-enabled device carried by the user to allow the PHB, PERS or fall detector device to initiate a call over a mobile telecommunications network to the call centre. These devices are sometimes referred to as mobile PERS (MPERS) devices and can be used anywhere where there is cellular network coverage. As the typical users of these MPERS devices are elderly or those with some form of physical or mental impairment, it is important for the devices to be as simple to operate as possible. As a result, mobile telecommunications functionality is preferably integrated into a dedicated PHB or PERS pendant that is worn by the user and that typically only has a single activation button or a very small number of manual controls. On activation of the MPERS device, a call is automatically placed to the call centre number preset in the device.

Given the nature of the MPERS devices discussed above, it is desirable to minimize their power consumption in order to maximize the battery life and reduce the frequency with which the user has to recharge or replace the batteries.

In addition, as a typical user of these devices may have hearing difficulties, it is desirable to ensure that audio output by the MPERS device is as clear and audible as possible for the user.

SUMMARY OF THE INVENTION

It has been recognized that as these MPERS devices are only used to place calls to a predetermined call centre, it is possible to design the overall system for much of the processing of the audio signals that is typically done by a mobile telecommunications device to be moved to communications equipment that resides in the call centre. This communications equipment can perform the required processing on the incoming audio signals (i.e. audio signals from the MPERS device to the call centre), in addition to the usual processing of the outgoing audio signals (i.e. audio signals from the call centre to the MPERS device).

This provides a number of advantages. Firstly, it reduces the amount of processing that the MPERS device has to perform, which in turn reduces the power consumption of the device. Secondly, the processing algorithms that typically run on mobile devices are optimized for those devices (i.e. they are of relatively low-complexity), which limits the performance of those algorithms. Allowing the processing to be performed in equipment in the call centre means that more complex algorithms with improved performance can be used. Thirdly, the devices and the particular user involved in any given communication will be known, so the processing of either or both of the incoming and outgoing audio streams can be optimized for the MPERS device being used, the equipment being used by the person in the call centre, the environment in which the person in the call centre is operating, the particular characteristics of the user (e.g. hard of hearing) and/or the particular preferences of the user and/or person in the call centre. A further advantage is that the algorithms or other processing used on the audio signals can be easily updated or adapted over time, without affecting the MPERS devices.

A first aspect of the invention provides communications equipment for use by a call centre to enable communications between the call centre and one or more user devices, the communications equipment comprising audio processing circuitry for processing audio signals received from the user devices over a communications network, wherein the processing circuitry is configured to perform acoustic echo cancellation and/or noise suppression and/or dereverberation processing on the received audio signals to cancel acoustic echoes and/or suppress noise and/or suppress reverberation that is present in the audio signals received from the user device.

In preferred embodiments, the audio processing circuitry is further configured to apply equalization and/or gain settings to the audio signals received from the user device over the communications network.

The audio processing circuitry can also be configured to process audio signals generated at a communication device in the call centre prior to transmission of said generated audio signals to the user device over the communications network. In this case, the audio processing circuitry can also be configured to process said generated audio signals to cancel acoustic echoes and/or suppress noise and/or suppress reverberation that is present in said generated audio signals, and/or apply equalization and/or gain settings to said generated audio signals.

In preferred embodiments, the communications equipment further comprises a database for storing information on the call centre environment, one or more user devices, one or more call centre devices, preferences of users associated with the one or more user devices and/or preferences of personnel in the call centre.

Preferably, on initiation of a call to the call centre by one of the user devices, the communications equipment is configured to retrieve the information relevant to the call from the database, and the audio processing circuitry is configured to adjust the processing of the audio signals based on the retrieved information.

In preferred embodiments, the audio processing circuitry is configured to apply the equalization and/or gain settings to the audio signals according to preferences in the retrieved information.

In further preferred embodiments, the information retrieved from the database comprises equalization settings appropriate for a user of a user device that has difficulty hearing.

In a further embodiment of the invention, the communications equipment is further configured to control the user device to deactivate or activate one or more parts of audio processing circuitry contained in the user device based on an estimate of the power remaining in the user device, and to correspondingly activate or deactivate one or more parts of the audio processing circuitry in the communications equipment.

In particular implementations of the above embodiment, the communications equipment further comprises a database that stores information on one or more of the audio processing capability of the user devices, audio processing circuitry that is currently active in the user devices, a maximum battery capacity of the user devices, the time since the last recharge of the battery in the user device and a model of the rate at which power is consumed by the user device; and the communications equipment is configured to estimate the power remaining in the battery of the user device using the information stored in the database.

In some embodiments, the audio processing circuitry comprises a delay estimator configured to estimate the delay between transmitting an audio signal over the communication network to the user device and receiving an acoustic echo of that audio signal in the audio signals received from the user device over the communication network; and an acoustic echo canceller that is configured to remove the acoustic echo of the audio signal transmitted over the communication network to the user device using the estimated delay and a copy of the audio signal transmitted to the user device.

According to a second aspect of the invention, there is provided a communication system, comprising a communications equipment as described above and one or more user devices that are configured to transmit audio signals representing the speech of a user to the communications equipment via a communication network, wherein the one or more user devices are configured such that no or substantially no acoustic echo cancellation or noise suppression processing is performed on the audio signals prior to their transmission to the communications equipment.

In the communication system, the one or more user devices are preferably configured such that no or substantially no speech enhancement processing is performed on audio signals received from the communications equipment over the communication network prior to presentation of the audio signals to a user of the user device.

According to a third aspect of the invention, there is provided a method for use in a communication system comprising communications equipment used by a call centre and one or more user devices, the method comprising receiving audio signals from one of the user devices at the communications equipment; processing the received audio signals in the communications equipment to cancel acoustic echoes and/or suppress noise and/or suppress reverberation that is present in the audio signals; and presenting the processed audio signals to a user in the call centre.

According to a fourth aspect of the invention, there is provided a computer program product comprising computer readable code embodied therein, the computer readable code being configured such that, on execution by a suitable computer or processor, the computer or processor performs the method described above.

BRIEF DESCRIPTION OF THE DRAWINGS

Exemplary embodiments of the invention will now be described, by way of example only, with reference to the following drawings, in which.

DETAILED DESCRIPTION OF THE PREFERRED EMBODIMENTS

Figure 3:
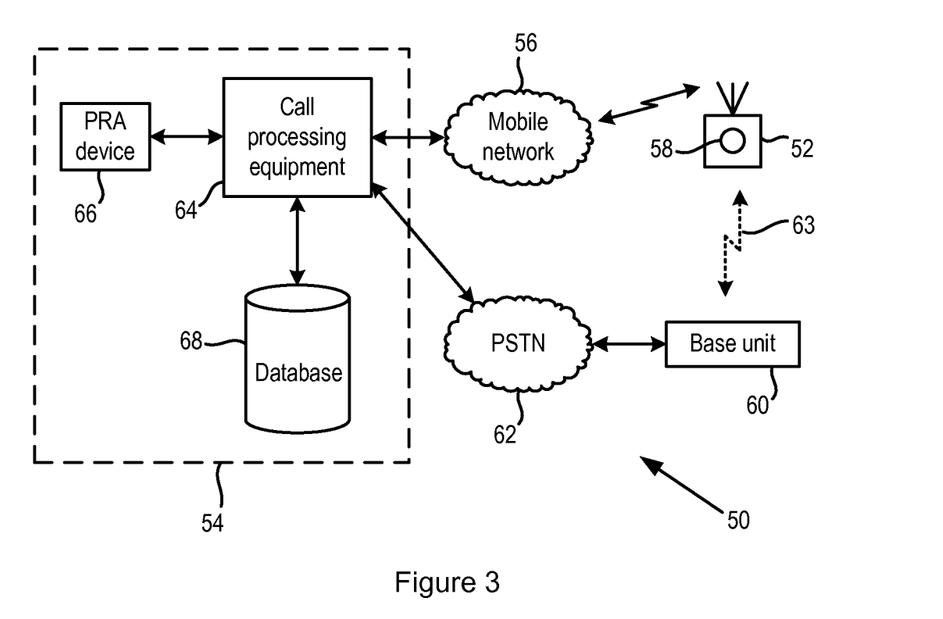
FIG. 3 is a block diagram of a system incorporating communications equipment according to an embodiment of the invention.

FIG. 3 shows a block diagram of an exemplary MPERS system 50 according to an embodiment of the invention. The system 50 comprises an MPERS user device 52 that is worn or carried by a user. The user device 52 comprises components suitable for enabling the user to communicate wirelessly with a call centre 54. Thus, the user device 52 comprises transceiver circuitry that is suitable for establishing a call to the call centre 54 over a wireless network 56, a speaker for outputting the audio signal received from the call centre 54 and a microphone that is used to generate an audio signal for transmission to the call centre 54. The user device 52 is powered by a battery or other portable power source.

The user device 52 also comprises one or more user actuatable controls, such as button 58, that allow the user to activate the user device 52 in an emergency in order to contact a call centre 54. The user device 52 may also contain one or more sensors that are configured to monitor the movements of the user and to determine if the user has suffered a fall. In such a case, the user device 52 can be configured to automatically initiate a call to the call centre 54 (since the user may be unconscious and unable to activate button 58).

The user device 52 typically also has an associated base unit 60 that is located in the user's home and that is connected to a fixed communication network, such as public switched telephone network (PSTN) 62, and a mains power supply. When the user is at home and in the vicinity of the base unit 60 (i.e. the user is at home), the base unit 60 can be used to initiate the call to the call centre 54 via PSTN 62, rather than the user device 52 establishing a call via the wireless network 56. In this case, the base unit 60 can comprise a respective speaker and microphone arrangement that allow the user to communicate with the call centre 54 without having to make use of the user device 52. Alternatively, when the user device 52 is in the vicinity of the base unit 60, the user device 52 can be configured to communicate with the call centre 54 via the base unit 60 (for example by using a short-range wireless communication link between the user device 52 and base unit 60, indicated by arrow 63 in FIG. 3). Either arrangement can help to reduce the power consumption of the user device 52 while the user is at home.

In the call centre 54, call processing equipment 64 is provided that processes incoming calls from one or more user devices 52 (and in particular processes the incoming and outgoing audio signals). The processed incoming audio signal is provided to a communications device 66 that is used by an operator in the call centre 54 (referred to herein as personal response associates—PRAs). The PRA device 66 may comprise any suitable equipment that allows the PRA to communicate with the user. For example, the PRA device 66 may be in the form of a conventional telephone handset, but preferably it is in the form of a headset or earpiece.

In accordance with an aspect of the invention, the call processing equipment 64 carries out processing of the audio signals, such as echo cancellation and/or noise suppression and/or dereverberation and optionally speech processing such as equalization or voice morphing, that is typically carried out at respective ends of the call (i.e. by processing circuitry within both the mobile device 52 and PRA device 66). Moving all the audio signal enhancement processing typically performed on the cellular baseband modules or a dedicated digital signal processor (DSP) in the user device 52 to the call centre equipment 64 reduces the processing burden on the user device 52, thereby improving the battery life. In addition, it is possible to use more complex and power-intensive processing algorithms in the call centre equipment 64 than is possible in user device 52, improving the performance of the communication link between the call centre 54 and user device 52.

Furthermore, the call processing equipment 64 can carry out the audio signal processing making use of information stored in a database 68 at the call centre 54. As described in more detail below, the information stored in the database 68 can comprise any of information on the call centre environment (i.e. the acoustic environment around the PRA, and in particular the effect of the acoustic environment on the processing of the audio signals), information on the user devices 52 that the call centre 54 is responsible for managing (for example information on the acoustic characteristics of those devices, such as susceptibility to echo between the microphone and speaker and/or a power usage model of the device), information on one or more PRA devices 66 (for example, similar to the information on the user devices 52, the acoustic characteristics of those devices 66), information on the preferences of users associated with the user devices 52 (for example the preferred equalization and/or gain settings, preferred audio output volume, whether the user prefers to speak to a male or female PRA, etc.) information on, and/or preferences for, the PRAs in the call centre 54 (for example the equalization and/or gain settings required to provide the PRA with their preferred call experience) and/or information about calls previously placed to the call centre (for example the total duration of calls from a specific user device). Making use of information stored in the database 68 in this way increases the flexibility of the system 50, and in particular allows the processing to be customized to particular users and/or PRAs.

The information on the environment at the call centre refers to the acoustic environment that the relevant PRA (i.e. the one that will answer the call) is working in. It is possible to configure the environment in a way to limit the capture of background noise by the microphone in the PRA device 66. For example, dry acoustic environments with reverberation times of less than 250 ms and additional acoustic isolation between PRAs can reduce reverberation and background noise.

The use of a close-talking microphone headset with in-ear speakers as the PRA device 66 means that the signal to noise ratio on the microphone will be increased while also drastically reducing the acoustic echo between the microphone and speaker. The use of such a device 66 by the PRA, or any other type of device, can be noted in the database 68 and used to adapt the processing of the outgoing audio signals.

The call processing equipment 64 can comprise a computer or server running appropriate software for implementing the audio signal processing and call handling procedures, although it will be appreciated that one or more of the functions provided by the call processing equipment 64 can be implemented using dedicated hardware, such as DSPs.

It will also be appreciated that, in response to (and in particular during) a call from a user, the PRA may need to contact the emergency services or seek other assistance for the user. Therefore, the call processing equipment 64 can be configured such that it can establish calls with the emergency services while the call with the user device 52 is ongoing.

In further embodiments of the invention, the call processing equipment 64 in the call centre can be configured to accept calls made via a number of different types of communication network, such as cellular, PSTN, voice over IP (VoIP), etc. In this case, the equipment 64 can adjust the processing based on the type of network used to establish the call. Thus, the database 68 may contain information on how the processing should be adjusted for the different types of network.

The information on the preferences of the user (for example the equalization and gain settings and/or whether they prefer to speak to a male or female PRA) can be determined during a calibration session when the user first subscribes to the MPERS service.

Figure 4:
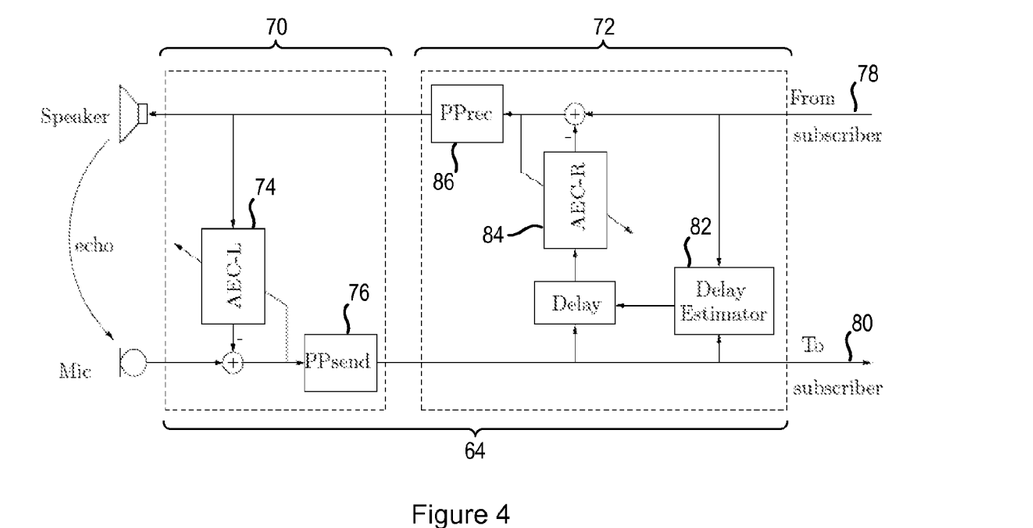
FIG. 4 is a block diagram showing part of the communications equipment in FIG. 3 in more detail.

FIG. 4 shows part of the call processing equipment 64 in more detail, illustrating how the processing of the incoming and outgoing audio signals can be performed according to an aspect of the invention. In FIG. 4, two processing stages are shown, processing stage 70 is for processing the audio signal provided by the PRA that is to be transmitted to the user device 52, and processing stage 72 is for processing the audio signal received from the user device 52 for presentation to the PRA. It will be appreciated that in conventional communication systems, processing stage 72 would be found in the far-end device (the user device 52), rather than in the call processing equipment 64 in the call centre 54 as in the present invention.

The send processing stage 70 includes local acoustic echo canceller AEC-L 74 and post-processing unit PPsend 76. Because the acoustic environment at the call centre 54 can be controlled, AEC-L 74 is able to remove most, if not all, of the echo, requiring little echo suppression on the part of the post-processor PPsend 76 in terms of residual echo suppression that remain on the output of the echo canceller 74. PPsend 76, however, can also apply equalization to the transmitted audio signal and can base this equalization either on pre-stored user preference information stored in the database 68 or by estimating the noise level on the receive line 78 from the user device 52.

The latter might be difficult with standard noise estimators since coders like adaptive multi-rate (AMR) that include voice activity detectors may not transmit noise-only segments. However, because more advanced processing can be applied at the call centre 54 than in a conventional mobile device, and because acoustic information such as coupling and sensitivity of the devices 52, 66, are known, advanced noise estimation algorithms that estimate noise levels even during speech activity to not only apply noise suppression but reinforce frequency regions of the PRA's voice to increase intelligibility can be used.

The echo canceller AEC-L 74 can be implemented using a variety of adaptive filtering algorithms such as the NLMS algorithm described above.

The receive processing stage 72 has to take into account the long round trip delays between the send audio signals (sent on line 80) and the receive audio signals since this path contains the speech coders and any additional delays incurred through tandeming. Therefore, a delay estimator unit 82 is provided to compute the round trip delay and offset the (remote signal) acoustic echo canceller AEC-R 84. This helps to limit the length of the adaptive filter that is used to implement the acoustic echo canceller 84, which is essential for improving the ability of the echo canceller 84 to track nonlinearities produced by the speech coders.

The acoustic echo canceller AEC-R 84 will be implemented differently and with higher complexity compared to AEC-L 74 to handle coding nonlinearities. In addition, depending on the preference of the PRA of call centre provider, the post-processing unit 86 may be tuned to allow some remaining echo of the PRA's voice (within a tolerable range) to be heard by the PRA. This echo can serve as an important feedback mechanism to the PRA to let him or her know that their voice is getting through to the user.

Due to the control over the acoustic environment at the call centre 54 that the invention provides, problems with acoustic howling (which is characterized as an uncontrollable feedback of acoustic echo) are avoided and the robustness of the system is improved compared to known systems. The robustness and performance of the send signal processing can be controlled and ensured through control of the acoustic environment in the call centre 54 and appropriate guidelines for the usage of the PRA devices 66.

In a further embodiment, processing stage 72 (which processes the audio signals received from the user device 52) can include respective processing blocks for modeling channel nonlinearities for the send/receive path which can be used to model various encoder/decoder nonlinearities that can be encountered in communication networks as well as nonlinearities related to the user device 52 itself (which is usually small and therefore uses smaller loudspeakers which are prone to nonlinearities at higher output levels).

Figure 5:
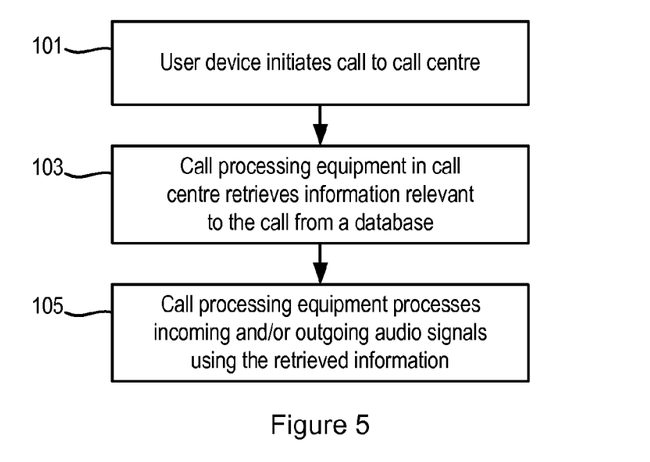
FIG. 5 is a flow chart illustrating a method according to an embodiment of the invention.

A flow chart illustrating a method according to an embodiment of the invention is shown in FIG. 5. In step 101, a user device 52 initiates a call to the call centre 54. As indicated above, this call can be initiated by the user manually pressing a button 58 on the user device 52, or by the user device 52 automatically determining that the user requires assistance.

When an incoming call is received in the call processing equipment 64, the call processing equipment 64 queries the database 68 to determine the information relevant to the call (step 103). As described above, this information could concern preferences of the user associated with the user device 52 making the call, preferences of the PRA that will be handling the call in the call centre 54, details of the acoustic characteristics of the device 66 used by the PRA, details of the acoustic characteristics of the user device 52 and/or details of the acoustic environment in the call centre 54.

The call processing equipment 64 then starts processing the call (i.e. processing the incoming audio signals from the user device 52 and processing the outgoing audio signals from the PRA device 66) using the information obtained from the database 68 in step 103.

The method in FIG. 5 is repeated each time that a new call is initiated by a user device 52 with the call centre 54.

According to one particular embodiment of the invention, the user device 52 is configured to provide very limited (or no) echo suppression due to power constraints such that a high level of echo is fed back to the call centre 54. For example, rather than employing a long adaptive filter with a high computational complexity, the user device can contain a simple fixed filter that models the direct path between the loudspeaker and microphone and can be programmed during production. The information stored in the database 68 relating to the user device 52 can indicate this fact, and this can be used by the call processing equipment 64 to adjust the level of the receive/send processing to limit the amount of echo presented to the PRA.

According to another embodiment of the invention, where the user of a particular device 52 has hearing difficulties, the information on the user preferences stored in the database 68 can indicate appropriate equalization settings that are used by the send processor 76 to boost the high frequency portion of the PRA's voice.

According to another embodiment of the invention, if the PRA in the call centre 54 is to use a hands-free or handset device in a reverberant environment, the information on the PRA device 66 and/or PRA environment stored in the database 68 can indicate that the send processor 76 should use longer filter lengths in the echo canceller 74. In addition or alternatively, if the call centre 54 is particularly noisy at a certain time of day, then the information stored in the database 68 can indicate that additional noise suppression can be applied by the send processor 76 either manually or automatically.

According to another embodiment of the invention, processing blocks in a cellular module of the user device 52 can be selectively activated or deactivated in response to control signals from the call processing equipment 64 that are generated based on the power remaining in the battery of the user device 52. This allows the user device 52 to perform some or all of the processing of the audio signals when it has sufficient power remaining. The call processing equipment 64 correspondingly activates or deactivates part or all of processing stage 72 to ensure that the incoming audio signals are appropriately processed.

In this embodiment, the call processing equipment 64 can estimate the power remaining in the battery of the user device 52 from information stored in the database 68, for example relating to the number of audio processing features that have been enabled in the user device 52 together with their duration of operation since deployment of the user device 52 or the last recharge cycle, and/or a model of the power usage of the user device 52. The estimate of the current battery level is evaluated by the call processing equipment 64 to determine whether to instruct the user device 52 to disable some or all of the audio processing in the user device 52 and to activate the corresponding processing blocks in processing stage 72 at the call centre 54. In an alternative implementation, the user device 52 can transmit an indication of the remaining battery level to the call processing equipment 64 on initiation of a call.

It will be appreciated that in embodiments of the invention where the user device 52 is enabled for data transmission (for example the device 52 comprises a cellular module for a third or subsequent generation telecommunication network), some or all of the information required by the call centre equipment 64 to process the audio signals that is stored in the database 68 as described above can instead be stored in the user device 52 and transmitted to the call centre on initiation of a call.

Thus, the invention described provides improved call processing in a wider range of environments than conventional mobile communication systems, and in which the processing can be easily adapted to the needs or preferences of the user. Such flexibility is possible due to the asymmetric arrangement of the communication system 50 in which the call centre 54 has full control over the audio signal processing, thereby relieving the burden from the user of the user device 52 and the user device 52 itself (which therefore improves the battery life of the device 52).

While the invention has been illustrated and described in detail in the drawings and foregoing description, such illustration and description are to be considered illustrative or exemplary and not restrictive; the invention is not limited to the disclosed embodiments.

Variations to the disclosed embodiments can be understood and effected by those skilled in the art in practicing the claimed invention, from a study of the drawings, the disclosure and the appended claims. In the claims, the word "comprising" does not exclude other elements or steps, and the indefinite article "a" or "an" does not exclude a plurality. A single processor or other unit may fulfill the functions of several items recited in the claims. The mere fact that certain measures are recited in mutually different dependent claims does not indicate that a combination of these measures cannot be used to advantage. A computer program may be stored/distributed on a suitable medium, such as an optical storage medium or a solid-state medium supplied together with or as part of other hardware, but may also be distributed in other forms, such as via the Internet or other wired or wireless telecommunication systems. Any reference signs in the claims should not be construed as limiting the scope.

The invention claimed is:

1. Communications equipment for use by a call centre to enable communications between the call centre and one or more user devices, the communications equipment comprising:
   audio processing circuitry for processing audio signals received from the user devices and audio signals transmitted to the user devices over a communications network, wherein the processing circuitry includes:
      a first audio processing device configured to receive audio signals from the user devices, the first audio processing device including:
         a first acoustic echo canceller processor configured to cancel at least one acoustic echo present in the audio signals received from the user devices; and
         a first post-processor configured to suppress noise and reverberation present in the audio signals received from the user devices;
      a second audio processing device configured to transmit audio signals to the user devices, the second audio processing device including:
         a second acoustic echo canceller processor configured to cancel at least one acoustic echo present in the audio signals transmitted to the user devices; and
         a second post-processor configured to suppress noise and reverberation present in the audio signals transmitted to the user devices;
   a database for storing information on the call centre environment, one or more user devices, one or more call centre devices, preferences of users associated with the one or more user devices and/or preferences of personnel in the call centre;
   wherein, on initiation of a call to the call centre by one of the user devices, the communications equipment is configured to retrieve the information relevant to the call from the database, and the audio processing circuitry is configured to adjust the processing of the audio signals performed by the audio processing circuitry including adjusting the acoustic echo cancellation based on the retrieved information.

2. Communications equipment as claimed in claim 1, wherein the audio processing circuitry is further configured to apply equalization and/or gain settings to the audio signals received from the user device over the communications network.

3. Communications equipment as claimed in claim 2, wherein the audio processing circuitry is configured to apply the equalization and/or gain settings to the audio signals according to preferences in the retrieved information.

4. Communications equipment as claimed in claim 3, wherein the retrieved information comprises equalization settings appropriate for a user of a user device that has difficulty hearing.

5. Communications equipment as claimed in claim 1, wherein the audio processing circuitry is further configured to process audio signals generated at a communication device in the call centre prior to transmission of said generated audio signals to the user device over the communications network.

6. Communications equipment as claimed in claim 5, wherein audio processing circuitry is configured to process said generated audio signals to cancel acoustic echoes and/or suppress noise and/or suppress reverberation that is present in said generated audio signals, and/or apply equalization and/or gain settings to said generated audio signals.

7. Communications equipment as claimed in claim 1, wherein the communications equipment is further configured to control the user device to deactivate or activate one or more parts of audio processing circuitry contained in the user device based on an estimate of the power remaining in the user device, and to correspondingly activate or deactivate one or more parts of the audio processing circuitry in the communications equipment.

8. A communication system, comprising:
   a communications equipment as claimed in claim 1; and
   one or more user devices that are configured to transmit audio signals representing the speech of a user to the communications equipment via a communication network, wherein the one or more user devices are configured such that no or substantially no acoustic echo cancellation or noise suppression processing is performed on the audio signals prior to their transmission to the communications equipment.

9. A communication system as claimed in claim 8, wherein the one or more user devices are further configured such that no or substantially no speech enhancement processing is performed on audio signals received from the communications equipment over the communication network prior to presentation of the audio signals to a user of the user device.

10. Communications equipment for use by a call centre to enable communications between the call centre and one or more user devices, the communications equipment comprising:
   audio processing circuitry for processing audio signals received from the user devices over a communications network, wherein the processing circuitry is configured to perform acoustic echo cancellation and/or noise suppression and/or dereverberation processing on the received audio signals to cancel acoustic echoes and/or suppress noise and/or suppress reverberation that is present in the audio signals received from the user device,
   a database for storing information on the call centre environment, one or more user devices, one or more call centre devices, preferences of users associated with the one or more user devices and/or preferences of personnel in the call centre;
   wherein, on initiation of a call to the call centre by one of the user devices, the communications equipment is configured to retrieve the information relevant to the call from the database, and the audio processing circuitry is configured to adjust the processing of the audio signals based on the retrieved information;
   wherein the communications equipment is further configured to control the user device to deactivate or activate one or more parts of audio processing circuitry contained in the user device based on an estimate of the power remaining in the user device, and to correspondingly activate or deactivate one or more parts of the audio processing circuitry in the communications equipment;
   and wherein the database stores information on one or more of the audio processing capability of the user devices, audio processing circuitry that is currently active in the user devices, a maximum battery capacity of the user devices, the time since the last recharge of the battery in the user device and a model of the rate at which power is consumed by the user device;
   and wherein the communications equipment is configured to estimate the power remaining in the battery of the user device using the information stored in the database.

11. Communications equipment for use by a call centre to enable communications between the call centre and one or more user devices, the communications equipment comprising:
   audio processing circuitry for processing audio signals received from the user devices over a communications network, wherein the processing circuitry is configured to perform acoustic echo cancellation on the received audio signals to cancel acoustic echoes present in the audio signals received from the user device, wherein the audio processing circuitry comprises:
      a delay estimator configured to estimate the delay between transmitting an audio signal over the communication network to the user device and receiving an acoustic echo of that audio signal in the audio signals received from the user device over the communication network; and
      an acoustic echo canceller that is configured to remove the acoustic echo of the audio signal transmitted over the communication network to the user device using the estimated delay received from the delay estimator and a copy of the audio signal transmitted to the user device;
   a database for storing information on the call centre environment, one or more user devices, one or more call centre devices, preferences of users associated with the one or more user devices and/or preferences of personnel in the call centre;
   wherein, on initiation of a call to the call centre by one of the user devices, the communications equipment is configured to retrieve the information relevant to the call from the database, and the audio processing circuitry is configured to adjust the processing of the audio signals based on the retrieved information including adjusting operation of the acoustic echo canceller.

12. A communication system including:
   communications equipment as claimed in claim 11; and
   a user device comprising a personal help button (PHB) configured to communicate with the communications equipment, the user device providing no echo suppression.

13. A communication system including:
   communications equipment as claimed in claim 11; and
   a user device comprising a mobile telephone configured to communicate with the communications equipment, the user device providing no echo suppression.

14. A communication system including:
   communications equipment as claimed in claim 11; and
   a user device comprising a personal help button (PHB) including a loudspeaker and a microphone, the user device configured to communicate with the communications equipment, the user device including a fixed filter that models a direct path between the loudspeaker and the microphone.

15. A communication system including:
   communications equipment as claimed in claim 11; and
   a user device comprising a mobile telephone including a loudspeaker and a microphone, the user device configured to communicate with the communications equipment, the user device including a fixed filter that models a direct path between the loudspeaker and the microphone.

16. A method for use in a communication system comprising communications equipment used by a call centre and one or more user devices, the method comprising:
   receiving audio signals from one of the user devices at the communications equipment;
   cancelling acoustic echoes present in the audio signals with a first acoustic echo canceller processor;
   suppressing noise and reverberation present in the audio signals with a first post-processor;
   storing in a database information on the call centre environment, one or more user devices, one or more call centre devices, preferences of users associated with the one or more user devices and/or preferences of personnel in the call centre;
   on initiation of a call to the call centre by one of the user devices, retrieving the information relevant to the call from the database,
   adjusting the processing of the audio signals based on the retrieved information;
   cancelling acoustic echoes present in the audio signals with a second acoustic echo canceller processor, the cancelling being adjustable to cancel the acoustic echoes;
   suppressing noise and reverberation present in the audio signals with a second post-processor; and presenting the processed audio signals to a user in the call centre.

17. A non-transitory computer program product comprising computer readable code embodied therein, the computer readable code being configured such that, on execution by a suitable computer or processor, the computer or processor performs the method claimed in claim 16.

\* \* \* \* \*